(12) United States Patent
Suzuki et al.

(10) Patent No.: US 11,378,147 B2
(45) Date of Patent: *Jul. 5, 2022

(54) SPRING AND MANUFACTURE METHOD THEREOF

(71) Applicant: NHK SPRING CO., LTD., Yokohama (JP)

(72) Inventors: Takeshi Suzuki, Yokohama (JP); Yoshiki Ono, Yokohama (JP); Shimpei Kurokawa, Yokohama (JP); Kosuke Shibairi, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 153 days.

This patent is subject to a terminal disclaimer.

(21) Appl. No.: 16/559,137

(22) Filed: Sep. 3, 2019

(65) Prior Publication Data

US 2019/0390727 A1 Dec. 26, 2019

Related U.S. Application Data

(62) Division of application No. 13/811,152, filed as application No. PCT/JP2011/068335 on Aug. 4, 2011, now abandoned.

(30) Foreign Application Priority Data

Aug. 4, 2010 (JP) .............................. JP2010-175593
Nov. 22, 2010 (JP) .............................. JP2010-260615

(51) Int. Cl.
*F16F 1/02* (2006.01)
*C21D 9/02* (2006.01)
(Continued)

(52) U.S. Cl.
CPC ................ *F16F 1/021* (2013.01); *B24C 1/10* (2013.01); *C21D 1/18* (2013.01); *C21D 7/06* (2013.01);
(Continued)

(58) Field of Classification Search
None
See application file for complete search history.

(56) References Cited

U.S. PATENT DOCUMENTS 3,847,678 A * 11/1974 Furr ........................ F16F 1/021
148/547
5,152,851 A 10/1992 Yamamoto et al.
(Continued)

FOREIGN PATENT DOCUMENTS

JP 63312917 A * 12/1988
JP S63-312917 A 12/1988
(Continued)

OTHER PUBLICATIONS

Ayada et al. Mechanical Properties of Spring Wire Drawn and Tempered at Lower Bainite Region. Iron and Copper. vol. 85, No. 8, 1999, pp. 35-43. Written English Translation. (Year: 1999).*
(Continued)

*Primary Examiner* — Paul A Wartalowicz
*Assistant Examiner* — Stephani Hill
(74) *Attorney, Agent, or Firm* — Oliff PLC (57) ABSTRACT

A spring consists of, by mass %, 0.5 to 0.7% of C, 1.0 to 2.0% of Si, 0.1 to 1.0% of Mn, 0.1 to 1.0% of Cr, not more than 0.035% of P, not more than 0.035% of S, and the balance of Fe and inevitable impurities. The spring has a structure including not less than 65% of bainite and 4 to 13% of residual austenite by area ratio in a cross section. The spring has a compressive residual stress layer in a cross section from a surface to a depth of 0.35 mm to D/4, in
(Continued)

Reflection electron Image (SEM)   Carbon element map (FE-EPMA)

which D (mm) is a circle-equivalent diameter of the cross section. The spring has a high hardness layer with greater hardness than a center portion by 50 to 500 HV from a surface to a depth of 0.05 to 0.3 mm.

14 Claims, 1 Drawing Sheet

(51) Int. Cl.
  *C22C 38/04* (2006.01)
  *C22C 38/02* (2006.01)
  *C21D 7/06* (2006.01)
  *C21D 1/18* (2006.01)
  *C22C 38/18* (2006.01)
  *C21D 8/06* (2006.01)
  *B24C 1/10* (2006.01)

(52) U.S. Cl.
  CPC ............. *C21D 8/065* (2013.01); *C21D 9/02* (2013.01); *C22C 38/02* (2013.01); *C22C 38/04* (2013.01); *C22C 38/18* (2013.01); *C21D 2211/001* (2013.01); *C21D 2211/002* (2013.01); *C21D 2211/008* (2013.01)

(56) References Cited

U.S. PATENT DOCUMENTS

| 5,282,906 | A | 2/1994 | Heitmann et al. |
| 2005/0173028 | A1 | 8/2005 | Suda et al. |
| 2006/0169367 | A1 | 8/2006 | Yuse et al. |
| 2006/0201588 | A1 | 9/2006 | Suda et al. |
| 2006/0225819 | A1 | 10/2006 | Yoshihara |
| 2007/0125456 | A1 | 6/2007 | Kochi et al. |
| 2010/0024923 | A1 | 2/2010 | Sugimura et al. |
| 2010/0175795 | A1 | 7/2010 | Choi et al. |
| 2012/0024436 | A1 | 2/2012 | Suzuki et al. |

FOREIGN PATENT DOCUMENTS

| JP | S64-083644 | A |   | 3/1989 |
| JP | H02-057637 | A |   | 2/1990 |
| JP | H02-129422 | A |   | 5/1990 |
| JP | H03-215623 | A |   | 9/1991 |
| JP | H07-179936 | A |   | 7/1995 |
| JP | H11-080895 | A |   | 3/1999 |
| JP | 2001-220650 | A |   | 8/2001 |
| JP | 2002-309334 | A |   | 10/2002 |
| JP | 2003105497 | A | * | 4/2003 |
| JP | 2004-315967 | A |   | 11/2004 |
| JP | 2005-120479 | A |   | 5/2005 |
| JP | 2006-291291 | A |   | 10/2006 |
| JP | 2007-154240 | A |   | 6/2007 |
| JP | 2007-302950 | A |   | 11/2007 |
| JP | 2008-163423 | A |   | 7/2008 |
| JP | 4330306 | B2 |   | 9/2009 |
| WO | 2010/110041 | A1 |   | 9/2010 |

OTHER PUBLICATIONS

Jinbo et al. "High strength, oil-tempered steel wire for valve springs manufactured by rapid heating mono-strang process" Kobelco Technology Review No. Nov. 27, 2007. pp. 23-27. (Year: 2007).*
JP 2003-105497 machine translation (Year: 2003).*
JP 63-312917 machine translation (Year: 1988).*
Poepper et al. Production and properties of alpha/gamma structural states in low-alloy spring steel. Neue Huette (1984), 29(3), 92-96. STN abstract. (Year: 1984).*
May 21, 2015 Extended Search Report issued in European Application No. 11814765.1.
M. Ayada, K. Inoue, N. Tsuji, Y. Saito. "Mechanical properties of spring wire drawn and tempered at lower bainite region." Tetsu to Hagane (1999) 85(8), 605-612.
T. Jinbo, T. Jiwara, S. Suda, N. Ibaraki "High strength, oil-tempered steel wire for valve springs manufactured by rapid heating monostrand process". Kobelco Technology Review No. Nov. 27, 2007. pp. 23-27.
Shah "The Hand Book on Mechanical Maintenance." http://practicalmaintenance.net/?p=1345. Accessed Apr. 14, 2016.
Zurob et al. Metallurgical and Materials Transactions A. Mar. 2013. vol. 44A, 1454-1461. (Year: 2013).
M. Ayada, K. Inoue, N. Tsuji, Y. Saito. "Mechanical properties of spring wire drawn and tempered at lower bainite region." Tetsu to Hagane (1999) 85(8), 605-612. Written English Translation. (Year: 1999).
Bramfit. Part II Irons, Steels, and High-Performance Alloys Structure/Property Relationships in Iron and Steels. Metals Handbook, Desk Edition, 2nd Edition. ASM International (1998) 153-173. (Year:1998).
Tsuji et al. "Ausformed bainite in SUP7 spring steel." Tetsu-to-Hagane. vol. 85 (1999) No. 5 p. 419-426. (Year: 1999).
Ayada et al. "Effect of vanadium and niobium on restoration behavior after hot deformation in medium carbon spring steels." ISIJ International, vol. 38 (1998), No. 9, p. 1022-1031. (Year: 1998).
Ayada et al. "Development of aus-drawing process in medium carbon spring steel for coil springs." Tetsu-to-Hagane. vol. 85 (1999) No. 5 p. 411-418. (Year: 1999).
Nov. 1, 2011 International Search Report issued in International Patent Application No. PCT/JP2011/068335.

* cited by examiner

Fig. 1A

Reflection electron
Image (SEM)

Fig. 1B

Carbon element map
(FE-EPMA)

Fig. 1C

Crystal structure (phase)
map (EBSD)

Concentration profile of carbon
at line I - II (FE-EPMA)

SPRING AND MANUFACTURE METHOD THEREOF

This is a Divisional of application Ser. No. 13/811,152 filed Jan. 18, 2013, which in turn is a U.S. National Stage application claiming the benefit of prior filed International Application Number PCT/JP2011/068335, filed Aug. 4, 2011, in which the International Application claims priorities from Japanese Application Numbers 2010-260615 (filed on Nov. 22, 2010) and 2010-175593 (filed on Aug. 4, 2010), the entire contents of which are incorporated herein by reference.

TECHNICAL FIELD

The present invention relates to a spring with superior fatigue resistance and superior sag resistance, and relates to a production method therefor.

BACKGROUND ART

For example, materials for valve springs for automobile engines may include oil tempered carbon steel wires (SWO-V), oil tempered chromium-vanadium steel wires (SWOCV-V), and oil tempered chromium-silicon steel wires (SWOSC-V), which are specified in the Japanese Industrial Standards (HS). The oil tempered chromium-silicon steel wires are conventionally widely used in view of the fatigue resistance and the sag resistance. In recent years, reduction in weight of the valve spring is strongly desired in order to improve fuel efficiency of automobiles, and there is a trend of increasing tensile strength in spring wire so as to increase design stress of the valve spring. In a case of a spring wire having a metal structure of tempered martensite, such as an oil tempered wire specified in the JIS, notch sensitivity to cracks and defects such as inclusions is greatly increased according to the increase in the strength of the spring wire. Therefore, such a spring wire is more likely to break during cold spring forming (coiling) and for brittle fracture to occur while in use.

In a coil spring after it is coiled, tensile residual stress is generated in a direction in which external compressive force is applied during the coiling, and compressive residual stress is generated in a direction in which external tensile stress is applied during the coiling. Therefore, a spring wire with higher tensile strength tends to have these residual stresses at greater values. In addition, when a coil spring is compressively deformed, highest tensile stress is applied on a surface at an inner diameter side of the coil spring. Therefore, when a cold-formed coil spring is compressively deformed, high tensile stress is applied on the inner diameter side of the coil spring in addition to the tensile residual stress that is generated after it is coiled. Accordingly, the inner diameter side of the coil spring is likely to become a starting point of fatigue failure.

In this regard, it is necessary to maintain the fatigue resistance of the coil spring even when high stress is applied. In order to correspond to this, high compressive residual stress may be provided on a surface layer of a spring wire from a surface to deep inside the spring wire. For example, shot peening is widely used for providing compressive residual stress on a surface layer of a spring wire in order to improve the fatigue resistance of a spring.

However, since the yield strength is increased according to increase in the hardness of a spring wire in recent years, the amount of plastic strain that can be provided on the surface layer by the shot peening is decreased, and a thick compressive residual stress layer becomes difficult to form. The thickness of the compressive residual stress layer is a distance from the surface to a position where the compressive residual stress is zero, which is hereinafter called "thickness".

By increasing the compressive residual stress at the outermost layer by shot peening, breakage originating from the surface at an early time may be prevented. On the other hand, according to the increase in design stress in recent years, combined stress of applied stress and residual stress (net stress applied to an inside of a spring wire) reaches a maximum at around a depth of 200 to 600 μm from the surface. This depth from the surface in a radial direction depends on the diameter of the spring wire, the degree of the applied stress, and the like. If inclusions with sizes of approximately 20 μm exist within this area, stress concentrates on the inclusions. The concentrated stress may exceed the fatigue strength of the spring wire and make the inclusions starting points of breakage. Accordingly, the following techniques were disclosed in order to solve these problems.

A spring with superior fatigue resistance is disclosed in Japanese Unexamined Patent Application Laid-open No. 64-83644. This spring is produced by using an oil tempered wire rod in which an element such as V is added in the chemical composition of the steel that is specified in the JIS. The additional element increases toughness of the steel material by refining crystal grains and thereby improves the fatigue resistance; however, this increases the material cost.

A spring made of a silicon killed steel wire with superior fatigue characteristics is disclosed in Japanese Unexamined Patent Application Laid-open No. 2008-163423. The spring is obtained by coiling a steel material in which the amounts of Ba, Al, Si, Mg, and Ca are adjusted. In order to add these elements in balanced amounts, the process of steel refining is very difficult to control, whereby the production cost is high.

A spring with superior fatigue strength is disclosed in Japanese Unexamined Patent Application Laid-open No. 2005-120479. In this spring, the chemical composition of the steel is adjusted, and grain size is decreased while the size of inclusions is decreased because the inclusions may become starting points of fatigue failure. In this spring, the fatigue strength is increased, but the degree of the fatigue strength (maximum shear stress τ max=approximately 1200 MPa) is lower than a practical strength (τ max=approximately 1300 to 1400 MPa). The practical strength is required of lightweight and high strength valve springs of recent years.

In addition, a method of further performing a nitriding treatment for obtaining higher fatigue strength is disclosed in Japanese Unexamined Patent Application Laid-open No. 2005-120479. The nitriding treatment can increase the surface hardness, whereby the fatigue resistance may be improved. In this method, iron nitrides are formed on a surface layer and must be completely removed after the nitriding treatment, because the iron nitrides may cause decrease in the fatigue strength. Therefore, the production process is complicated, and the cost of the nitriding treatment is high, whereby the production cost is high.

A spring, which is made of a hard-drawn wire and has superior fatigue strength, is disclosed in Japanese Patent No. 4330306. The hard-drawn wire is a drawn wire rod of a pearlite structure or a mixed structure of ferrite and pearlite. The spring is formed by coiling the hard-drawn wire and then controlling a residual stress difference between the inner diameter side and the outer diameter side of the spring so as to be not more than 500 MPa. According to the technique disclosed in Japanese Patent No. 4330306, quenching treatment and tempering treatment are not necessary, whereas these treatments are generally widely used for producing oil tempered wires, whereby the costs therefor are decreased. In this technique, in order to control the residual stress difference so as to be not more than 500 MPa, the chemical composition of the steel must be adjusted, and the steel must be annealed at not less than 400° C. after it is coiled. Accordingly, the strength of the steel is decreased, and it is therefore difficult to obtain a high strength spring that meets recent requirements.

A spring steel wire with superior cold formability and high fatigue strength is disclosed in Japanese Unexamined Patent Application Laid-open No. 2-57637. This spring steel wire is obtained by adding Mo, V, and the like, to a chemical composition of a spring steel that is specified in the JIS and by austempering treatment. In this technique, the yield ratio (ratio of yield strength to tensile strength) is set to be not more than 0.85 in order to decrease tensile residual stress that may remain at the inner diameter side of a coil spring after the spring steel wire is cold formed. However, even when a spring wire with a yield ratio of not more than 0.85 is cold coiled and is then annealed, it is difficult to sufficiently decrease the tensile residual stress, which is generated after the cold coiling, from the surface to the inside. Therefore, even by subsequently performing shot peening, it is difficult to provide compressive residual stress from the surface to the deep inside, whereby improvement in fatigue resistance is limited. In addition, the kinds and the ratios of structures of the spring steel wire are not disclosed in Japanese Unexamined Patent Application Laid-open No. 2-57637.

On the other hand, recently, improvement of sag resistance of valve springs becomes increasingly important according to the increase in the design stress. If the sag resistance is low, the amount of sag of a spring is increased while high stress is applied, whereby engine speed is not increased as planned, and engine response becomes inferior.

Various techniques for improving the sag resistance have been proposed. A technique for improving the fatigue resistance and the sag resistance is disclosed in Japanese Unexamined Patent Application Laid-open No. 2004-315967. In this technique, concentrations mainly of Cr and Si are increased in a composition of a spring steel that is specified in the JIS, whereby quenchability and resistance to temper softening are improved. According to this technique, some degree of the sag resistance is improved, but the material cost is increased by highly alloying.

A technique for improving the sag resistance is disclosed in Japanese Unexamined Patent Application Laid-open No. 2007-302950. In this technique, a concentration mainly of Cr is increased and V is added in a composition of a spring steel that is specified in the JIS. Moreover, size, density per area, and composition, of cementite are specified so as to obtain precipitation strengthening effect of fine cementite and to prevent decomposition of the cementite during low-temperature annealing and nitriding. According to this technique, the material cost is increased by highly alloying, and the conditions of quenching and tempering must be strictly controlled so as to obtain the predetermined cementite structure. Accordingly, the production cost is increased.

Another technique for improving the sag resistance is disclosed in Japanese Unexamined Patent Application Laid-open No. 7-179936. In this technique, mainly V and N are added in a composition of a spring steel that is specified in the JIS. Moreover, austempering treatment and subsequent tempering treatment are performed, whereby a tempered bainite structure is obtained. According to this technique, the strength of obtained spring steel is low, and the sag resistance is insufficient. In addition, the material cost is increased by highly alloying, and the process is complicated, whereby the production cost is increased.

DISCLOSURE OF THE INVENTION

The present invention has been completed so as to solve the problems in the conventional techniques, and an object of the present invention is to provide a spring with superior fatigue resistance and a production method therefor. The spring is produced by decreasing the material cost in a simplified process.

Moreover, the present invention has been completed so as to solve the problems in the conventional techniques, and another object of the present invention is to provide a spring with superior sag resistance and a production method therefor. The spring is produced by decreasing the material cost in a simplified process.

The inventors of the present invention conducted intensive research on fatigue strength of a valve spring with high strength. As a result, the inventors of the present invention had the following idea. That is, by adjusting the composition of a spring steel and annealing conditions that are provided after coiling, some degree of residual stress, which is generated after the coiling, can be decreased. However, according to this method, it is difficult to completely remove the effect of the residual stress with respect to the fatigue strength while high strength of the spring steel is maintained. In contrast, it is effective to heat a spring wire to an austenitizing temperature so that the residual stress, which is generated by coiling, is substantially zero, after it is coiled. Moreover, the inventors of the present invention found the following. That is, by consecutively performing austempering treatment at a predetermined condition with respect to the spring wire that is heated to the austenitizing temperature, a structure, in which strength, ductility, and toughness are balanced, is obtained. As a result, the fatigue resistance of the spring wire is improved. Furthermore, by performing shot peening, residual austenite in a surface layer of the spring wire is transformed into martensite by deformation-induced transformation. Since volume expansion occurs by this transformation, high compressive residual stress is provided from the surface to the deep inside, whereby growth of fatigue cracks is prevented, and the fatigue resistance is improved.

The inventors of the present invention also found the following. That is, a coil spring, in which high compressive residual stress is provided from a surface to deep inside, may be made of an inexpensive material such as an oil tempered wire that is specified in the JIS, a hard-drawn wire having the same composition as that of the oil tempered wire, or the like. In addition, the coil spring is produced by performing ordinary shot peening in a later step without a special complicated heat treatment step as long as an appropriate heat history condition is selected so as to form a predetermined structure and predetermined concentrations of alloying elements are set. Moreover, the coil spring has high fatigue resistance corresponding to the requirements of the markets even when a nitriding treatment is not performed, whereas the nitriding treatment is usually performed. Accordingly, the processing cost is decreased, and the process is simplified.

The present invention provides a first spring that has been completed based on the above findings, and the spring consists of, by mass %, 0.5 to 0.7% of C, 1.0 to 2.0% of Si, 0.1 to 1.0% of Mn, 0.1 to 1.0% of Cr, not more than 0.035% of P, not more than 0.035% of S, and the balance of Fe and inevitable impurities. The spring has a structure including not less than 65% of bainite and 4 to 13% of residual austenite by area ratio in a cross section, and the residual austenite contains carbon at an average concentration of 0.65 to 1.7%. The spring has a compressive residual stress layer in a cross section from a surface to a depth of 0.35 mm to D/4, in which D (mm) is a circle-equivalent diameter of the cross section. The compressive residual stress layer has maximum compressive residual stress of 800 to 2000 MPa. The spring has a center portion with hardness of 550 to 650 HV in a cross section and has a high hardness layer with greater hardness than the center portion by 50 to 500 HV from a surface to a depth of 0.05 to 0.3 mm.

The present invention provides a first production method for a spring, and the method includes a step of preparing a wire rod, a step of forming the wire rod into a shape of a spring, a heat treatment step, and a shot peening step of shooting shot at the wire rod after the heat treatment step. The wire rod consists of, by mass %, 0.5 to 0.7% of C, 1.0 to 2.0% of Si, 0.1 to 1.0% of Mn, 0.1 to 1.0% of Cr, not more than 0.035% of P, not more than 0.035% of S, and the balance of Fe and inevitable impurities. In the heat treatment step, the wire rod is austenitized at a temperature of Ac3 point to (Ac3 point+250° C.) and is cooled at a cooling rate of not less than 20° C./second. Then, the wire rod is held at a temperature of Ms point to (Ms point+60° C.) for not less than 400 seconds and is cooled to room temperature at a cooling rate of not less than 20° C./second.

The Ac3 point is a boundary temperature at which a structure is transformed from a two-phase region of ferrite and austenite to a single-phase region of austenite during heating. The Ms point is a temperature at which generation of martensite starts during cooling. In the present invention, the "center portion" is a center portion of a circle of a circular cross section or a center of gravity of a shape of a cross section other than the circular cross section, such as a rectangular shape, an ellipse shape, or the like.

Moreover, the inventors of the present invention conducted intensive research on the sag resistance of a coil spring in conditions at around 120° C. Sag of a spring, which is designed so as to withstand high stress of maximum shear stress of approximately 1400 MPa, is affected primarily by dislocation glide. Therefore, the amount of sag is smaller when lower net stress is applied to a spring wire. The net stress is combined stress of stress, which remains in the spring wire even when no load is applied, and stress which is applied to the spring wire when load is applied. That is, tensile residual stress, which is generated by strain that remains after the cold coiling, adversely affects the sag resistance and is therefore preferably small. The tensile residual stress that is generated after the cold coiling can be decreased by annealing and is decreased with the increase in the annealing temperature. However, the material is softened accordingly, and there is a limit to increase in the resistance to temper softening by adjusting the composition. Therefore, it is essentially difficult to completely remove tensile residual stress while high strength of the spring steel is maintained by the annealing. In view of this, the inventors of the present invention reached the following conclusion. That is, it is effective for a coiled spring wire to be heated to an austenitizing temperature that is a high temperature so as to substantially completely remove the residual stress, which is generated by coiling, and then the structure of the coiled spring is improved.

In order to prevent sag while high strength of a spring steel is maintained, it is effective to prevent movement of mobile dislocations. As for this method, strain aging, which is performed by providing strain and low-temperature annealing, is generally widely used. In the strain aging, first, dislocation density is increased by providing strain, whereby some dislocations cross with or cut in forest dislocations and generate jogs and kinks. Some of the jogs and the kinks are immobilized and prevent movement of subsequent movable dislocations. In this case, movable dislocations are increased to some degree. Therefore, next, heating (aging) is performed so that solid-solved atoms such as carbon accumulate and surround the movable dislocations, whereby movement of the dislocations is prevented. If the movable dislocation density is too high, the number of the accumulated solid-solved atoms per length of dislocation is decreased, and the effects of the strain aging are decreased. Accordingly, the movable dislocation density needs to be preliminarily appropriately controlled before the aging is performed.

On the other hand, a conventional oil tempered wire has a metal structure in which martensite is tempered and has a mixed structure of ferrite with low carbon concentrations and cementite ($Fe_3C$) due to the tempering temperature (hereinafter called a "tempered martensite structure"). There may be cases in which austenite of a high temperature phase remains in the structure. Therefore, most carbon atoms are used for forming cementite, and the movable dislocation density with respect to the solid-solved atoms in ferrite is high, whereby it is difficult to improve the sag resistance by the strain aging. Even when strain is provided so as to increase pinning effect of jogs and the like, since the ductility of the structure is small, defects such as microscopic cracks are easily generated and adversely affect the fatigue resistance. Accordingly, the inventors of the present invention reached a conclusion that it is difficult to further improve the sag resistance by using the strain aging as long as the tempered martensite structure is used.

In view of these circumstances, the inventors of the present invention conducted intensive research and found the following. That is, by forming a structure so as to be made primarily of fine bainite with superior ductility after the coiling, greater plastic strain is provided without decreasing fatigue resistance compared with a case using a conventional tempered martensite structure. In this case, the movable dislocation density, which adversely affects the sag resistance, is decreased, whereby the movable dislocations are efficiently firmly fixed by the strain aging. Moreover, by providing a great amount of plastic strain in a setting step, large compressive residual stress is generated inside a spring wire and improves the sag resistance and the fatigue resistance. The setting step will be described later.

Furthermore, the inventors of the present invention focused on dispersion strengthening of a second phase in a metal structure and found the following. That is, the sag resistance is improved by dispersing fine residual austenite with high carbon concentrations in the structure, which is made primarily of fine bainite, at high density. In this case, the residual austenite prevents the movement of the dislocations. In general, since austenite that remains in the tempered martensite structure contains carbon at concentrations approximately equal to an average carbon concentration of a base phase, the residual austenite has low strength and thereby has been expected to adversely affect the sag resistance.

In this regard, the inventors of the present invention found the following. That is, by setting the carbon concentration in the residual austenite high so as to be greater than an average carbon concentration in a base phase, the strength of the residual austenite is improved. Therefore, this residual austenite does not adversely affect the sag resistance. In contrast, this residual austenite is effective for improving the sag resistance and the fatigue resistance. This is because effects of deformation-induced martensitic transformation (accompanying large volume expansion) are obtained by the residual austenite with high carbon concentrations when a surface layer is plastically deformed by shot peening. As a result, compressive residual stress in the surface layer of a spring wire is more increased compared with a conventional case. Specifically, the effects of the completely removal of the tensile residual stress, which remains after the cold coiling, by austenitizing heating, and the effects of the deformation-induced transformation of the residual austenite, are obtained. Therefore, a compressive residual stress layer is formed on a surface layer from a surface to deep inside by shot peening in a later step. In this case, in the entirety of the steel material, the structure is formed of fine bainite with superior ductility, and an immobilized rate of the movable dislocations is increased by the strain aging. Moreover, fine residual austenite with high strength is dispersed from the surface layer to the inside, whereby the effect for pinning dislocations is improved. Accordingly, fatigue resistance and sag resistance that are greater than those of an oil tempered wire are balanced.

The inventors of the present invention also found the following. That is, a coil spring may be made of an inexpensive material such as an oil tempered wire that is specified in the JIS, a hard-drawn wire having the same composition as that of the oil tempered wire, or the like. In addition, the coil spring is produced by performing ordinary shot peening and setting in later steps without a special complicated heat treatment step as long as an appropriate heat history condition is selected so as to form a predetermined structure and predetermined concentrations of alloying elements are set. Moreover, the coil spring has high sag resistance corresponding to the requirements of the markets even when a nitriding treatment is not performed, whereas the nitriding treatment is generally performed. Accordingly, the processing cost is decreased, and the process is simplified.

That is, the present invention also provides a second spring in which the residual austenite has an average circle-equivalent grain diameter of not more than 3 μm in the first spring.

The present invention also provides a second production method for a spring, and this method includes a step of preparing a wire rod, a step of forming the wire rod into a shape of a spring, a heat treatment step, and a shot peening step of shooting shot at the wire rod after the heat treatment step. The wire rod consists of, by mass %, 0.5 to 0.7% of C, 1.0 to 2.0% of Si, 0.1 to 1.0% of Mn, 0.1 to 1.0% of Cr, not more than 0.035% of P, not more than 0.035% of S, and the balance of Fe and inevitable impurities. In the heat treatment step, the wire rod is austenitized at a temperature of Ac3 point to (Ac3 point+250° C.) and is cooled at a cooling rate of not less than 20° C./second. Then, the wire rod is held at a temperature of (Ms point−20° C.) to (Ms point+60° C.) for not less than 400 seconds and is cooled to room temperature.

Effects of the Invention

According to the first spring of the present invention, a spring with superior fatigue resistance is obtained without performing a complicated heat treatment and a surface hardening treatment by using a spring wire which is easily available. The spring wire does not contain expensive alloying elements and has a composition of a spring steel that is specified in the JIS. The spring has a high hardness layer and a thick high compressive residual stress layer on a surface layer. The spring of the present invention has superior recycling efficiency because the amounts of the alloying elements are small. In addition, according to the spring of the present invention, the production process is simple, and processing time is decreased, whereby productivity is improved and energy is saved.

According to the second spring of the present invention, a spring with superior sag resistance is obtained without performing a complicated heat treatment and a surface hardening treatment by using a spring wire which is easily available. The spring wire does not contain expensive alloying elements and has a composition of a spring steel that is specified in the JIS. The spring has a high hardness area and a thick high compressive residual stress layer on a surface layer. The spring of the present invention has superior recycling efficiency because the amounts of the alloying elements are small. In addition, according to the spring of the present invention, the production process is simple, and processing time is decreased, whereby productivity is improved and energy is saved.

BEST MODE FOR CARRYING OUT THE INVENTION

1. First Embodiment

Reasons for limiting chemical composition of a steel that is used in the First Embodiment of the present invention will be described. The symbol "%" represents "mass %" in the following descriptions.

C: 0.5 to 0.7%

C is important for obtaining high strength of not less than 1800 MPa and a predetermined ratio of residual austenite at room temperature. In order to obtain these effects, it is necessary to add C at not less than 0.5%. On the other hand, if the concentration of C is excessive, the ratio of residual austenite, which is a soft phase, is excessively increased, whereby predetermined strength is difficult to obtain. Therefore, the amount of C is set to be not more than 0.7%.

Si: 1.0 to 2.0%

Si prevents generation of carbides from austenite matrix when C migrates from bainitic ferrite, which forms the bainite, to austenite. Therefore, Si is an essential element for obtaining predetermined residual austenite in which C is solid solved at high concentration. In addition, Si has a solid solution strengthening effect and is effective for obtaining high strength. In order to obtain these effects, not less than 1.0% of Si is necessary. In contrast, if the concentration of Si is excessive, the ratio of soft residual austenite is increased, whereby the strength is decreased. Accordingly, the concentration of Si is set to be not more than 2.0%.

Mn: 0.1 to 1.0%

Mn is added as a deoxidizing element during refining and stabilizes austenite. In order to obtain the residual austenite that is described in the present invention, it is necessary to add Mn at not less than 0.1%. On the other hand, if the concentration of Mn is excessive, segregation occurs, whereby workability is easily decreased. Therefore, the concentration of Mn is set to be not more than 1.0%.

Cr: 0.1 to 1.0%

Cr improves the quenchability of a steel material and facilitates strengthening. Moreover, Cr delays pearlitic transformation, whereby bainite structure is reliably obtained during cooling after the austenitizing heating, by preventing generation of pearlite structure. Therefore, it is necessary to add Cr at not less than 0.1%. On the other hand, if Cr is added at more than 1.0%, iron carbides are easily generated, and it is difficult to generate residual austenite. Accordingly, the concentration of Cr is set to be not more than 1.0%.

P, S: not more than 0.035%

P and S facilitate grain-boundary fracture by grain-boundary segregation. Therefore, the concentrations of P and S are desirably lower, but decrease in the concentrations of P and S is expensive in refining because they are impurities. Accordingly, the upper limits of the concentrations of P and S are set to be 0.035%. The concentrations of P and S are preferably not more than 0.01%.

Next, reasons for limiting area ratios of structures in a cross section will be described. The "cross section" is a cross section that orthogonally crosses a longitudinal direction of a spring wire.

Bainite: not less than 65%

Bainite is a metal structure that is obtained by isothermally transforming an austenitized steel material at a temperature range of not more than approximately 550° C. and more than a martensitic transformation start temperature. Bainite is composed of bainitic ferrite and iron carbide. Since the bainitic ferrite as a matrix has high dislocation density, and the iron carbide has a precipitation strengthening effect, bainitic structure improves the strength of the steel material. In the production method for a spring in the First Embodiment, a steel containing Si at high concentration is used and is held at a temperature of Ms point to (Ms point+60° C.), whereby coarsening of the iron carbide is prevented. Therefore, the bainite structure has a structure in which fine iron carbide is precipitated in the matrix of the bainitic ferrite, whereby grain boundary strength is not greatly decreased, and ductility and toughness are not greatly decreased although the steel material has high strength. Thus, bainite is an essential structure for obtaining high strength and high ductility, and the area ratio thereof is preferably higher. In order to obtain high strength and high ductility as described in the present invention, not less than 65% of the area ratio of the bainite is required. On the other hand, austenite that is not transformed during the isothermal holding becomes martensite or residual austenite by being subsequently cooled to room temperature. If the holding time for the isothermal holding is short, carbon concentration in the austenite that is not transformed during the isothermal holding is small, whereby the ratio of martensite is increased by the subsequent cooling, and the area ratio of bainite is less than 65%. Therefore, when the area ratio of bainite is less than 65%, high strength is obtained because the ratio of martensite is high, but notch sensitivity is greatly increased, whereby superior fatigue resistance is not obtained.

Residual Austenite: 4 to 13%

Residual austenite increases ductility and toughness by TRIP (Transformation-induced plasticity) phenomenon and is thereby effective for decreasing notch sensitivity. Moreover, the residual austenite expands in volume at a stress concentrated portion of an end of a crack by deformation (strain)-induced martensitic transformation, and compressive stress is applied by binding force of surroundings thereof, whereby degree of stress concentration is decreased, and growth rate of the crack is decreased. Furthermore, the residual austenite is transformed into martensite by deformation-induced transformation in a shot peening step. In this case, the residual austenite expands in volume, whereby high compressive residual stress is provided on a surface layer to deep inside. The surface layer that is processed by the shot peening contains residual austenite at a lower ratio than that of the inside, but not less than 4% of the ratio of residual austenite is necessary in a cross section in order to obtain the effect for preventing growth of cracks. On the other hand, if the ratio of residual austenite is too high, the strength of the steel material is greatly decreased. Therefore, the ratio of residual austenite is set to be not more than 13%.

Martensite: Balance (or 0%)

In the present invention, martensite is not essential but can be included at an area ratio of 5 to 30% so as to obtain predetermined tensile strength. If the area ratio of martensite exceeds 30%, high strength is obtained, but the notch sensitivity is increased, whereby superior fatigue resistance is not obtained.

Average Carbon Concentration in Residual Austenite: 0.65 to 1.7%

When the carbon concentration in the residual austenite is higher, tensile strain for starting deformation-induced martensitic transformation is higher, whereby high ductility and high toughness are obtained and the notch sensitivity is decreased. In addition, when the carbon concentration in the residual austenite is higher, the ratio of the volume expansion during the deformation-induced martensitic transformation of the residual austenite is higher. In this case, stress concentration at an end of a crack is decreased, and generation of high compressive residual stress to deep inside is facilitated. Accordingly, higher carbon concentration in the residual austenite is effective for improving the fatigue resistance. In order to obtain a compressive residual stress distribution (maximum compressive residual stress of not less than 800 MPa), not less than 0.65% of the average carbon concentration is necessary in the residual austenite. The compressive residual stress distribution will be described later. On the other hand, if the carbon concentration in the residual austenite is too high, the residual austenite is greatly stabilized, whereby the residual austenite does not have deformation-induced transformation and exists only as a soft phase. Therefore, the upper limit of the average carbon concentration in the residual austenite is set to be 1.7%.

Next, reasons for limiting various characteristics in a cross section of a spring wire will be described.

Compressive Residual Stress Distribution on Surface Layer

Compressive residual stress is provided on a surface layer primarily by shot peening. In the present invention, in addition to the compressive residual stress that is obtained by ordinary shot peening, higher compressive residual stress is provided to deep inside by the deformation-induced martensitic transformation of the residual austenite that exists in the steel material. The thickness of the compressive residual stress layer on the surface layer from a surface is set to be 0.35 mm to D/4, in which D (mm) is a circle-equivalent diameter of a cross section. This is because an area from a surface to a depth of 200 μm to approximately D/4 tends to become a starting point of fatigue failure due to combined stress of residual stress and stress that is applied by an external load when a spring wire has a diameter of 1.5 to 15 mm, for example. Therefore, less than 0.35 mm of the thickness of the compressive residual stress layer is insufficient for preventing fatigue failure that originates from the inside. On the other hand, if the compressive residual stress layer is too thick, tensile residual stress is greatly increased in order to balance stress in the entirety of the steel material. The tensile residual stress exists at an area that is deeper than a depth (crossing point) at which the compressive residual stress is zero. The tensile residual stress is combined with the tensile stress, which is generated in the spring wire by an external load, and facilitates generation of cracks. Therefore, the upper limit of the thickness of the compressive residual stress layer is set to be D/4.

The compressive residual stress layer is made so as to have maximum compressive residual stress of 800 to 2000 MPa. The maximum compressive residual stress is desirably higher in order to prevent generation and growth of fatigue cracks, and not less than 800 MPa of the maximum compressive residual stress is necessary in consideration of using the spring by setting high design stress. On the other hand, if the maximum compressive residual stress on the surface layer is too high, the tensile residual stress in the area that is deeper than the crossing point, which is generated for balancing the stress, may cause internal fracture, as described above. Accordingly, the upper limit of the maximum compressive residual stress is set to be 2000 MPa.

Hardness Distribution

In order to obtain necessary strength that is sufficient to withstand a load as a spring, not less than 550 HV of Vickers hardness is necessary at the center (center of gravity) of a cross section of a spring wire. On the other hand, if the hardness it too high, in general, the elongation is decreased, and notch (crack) sensitivity of the steel material is increased, whereby the fatigue strength may be decreased. Therefore, the hardness at the center of a cross section of a spring wire is set to be not more than 650 HV. A high hardness layer on the surface layer of the spring is effective for preventing generation of cracks and needs to have greater Vickers hardness than the center (center of gravity) by not less than 50 HV. On the other hand, if the hardness of the high hardness layer is too high, the high hardness layer is embrittled. Therefore, the upper limit of the difference in the hardness between the high hardness layer and the center is set to be not more than 500 HV. In addition, not less than 0.05 mm of the thickness of the high hardness layer is necessary in order to prevent generation of cracks. On the other hand, if the high hardness layer is too thick, the toughness of the steel material is decreased. Therefore, the thickness of the high hardness layer is set to be not more than 0.3 mm.

A production method for a spring of the present invention will be described. The spring of the present invention is produced as follows. After the steel material having the above-described chemical composition is coiled, both end surfaces of the coiled steel material are ground. Then, the coiled steel material is subjected to a heat treatment step. In the heat treatment step, the coiled steel material is austenitized at a temperature of Ac3 point to (Ac3 point+250° C.) and is cooled at a cooling rate of not less than 20° C./second. The coiled steel material is then held at a temperature of Ms point to (Ms point+60° C.) for not less than 400 seconds and is cooled to room temperature at a cooling rate of not less than 20° C./second. Next, the coiled steel material is subjected to shot peening. The structure of the steel material before it is heated to not less than Ac3 point is not specifically limited. For example, a hot forged steel bar or a drawn steel bar may be used as the steel material. Hereinafter, each of the steps will be described, and reasons for limitations are also described as necessary.

Coiling Step

The coiling step is a step of cold forming the steel material into a predetermined coil shape. The forming may be performed by using a spring forming machine (coiling machine) or by using a cored bar. The present invention is not limited to a coil spring and can be applied to any spring such as a plate spring, a torsion bar, a stabilizer, or the like.

Seating Surface Grinding Step

In this step, both end surfaces of the coiled steel material are ground so as to be flat surfaces that are perpendicular to an axis thereof. This step is performed as necessary.

Heat Treatment Step

In this step, the coiled steel material is austenitized and is cooled, and it is then isothermally held and is cooled. The isothermal holding may be performed by immersing the coiled steel material into a salt bath, for example, but it does not have to be performed by using the salt bath and may be performed by another method, such as a method of using a lead bath. The structure of the steel material before it is austenitized is not specifically limited. For example, a hot forged steel bar or a drawn steel bar may be used as the steel material. The austenitizing temperature is set at a temperature of Ac3 point to (Ac3 point+250° C.). If the austenitizing temperature is lower than Ac3 point, the coiled steel material is not austenitized, and a predetermined structure is not obtained. On the other hand, if the austenitizing temperature exceeds (Ac3 point+250° C.), diameters of prior austenite grains tend to be increased, whereby the ductility may be decreased.

The rate of cooling the coiled steel material to the isothermal holding temperature after the austenitizing is desirably higher, and the cooling needs to be performed at a cooling rate of not less than 20° C./second, preferably, not less than 50° C./second. If the cooling rate is less than 20° C./second, pearlite is generated during the cooling, and the structure that is described in the present invention is not obtained. The isothermal holding temperature needs to be set at a temperature of Ms point to (Ms point+60° C.), which is a very important parameter to be controlled in the production method for the spring of the present invention. If the isothermal holding temperature is less than an Ms point, martensite, which is generated at an initial stage of the transformation, prevents improvement of the ductility, and the ratio of bainite that is described in the present invention is not obtained. On the other hand, if the isothermal holding temperature exceeds (Ms point+60° C.), the ratio of residual austenite is excessively increased, whereby the tensile strength is decreased, and strength sufficient to withstand a load as a spring is not obtained. The isothermal holding time needs to be set at not less than 400 seconds, which is also a very important parameter to be controlled in the production method for the spring of the present invention. If the holding time is less than 400 seconds, bainitic transformation hardly proceeds, whereby the ratio of martensite is increased whereas the ratio of bainite is decreased, and the structure that is described in the present invention is not obtained. On the other hand, if the holding time is too long, the bainite is not further generated, and the production cost is increased. Therefore, the holding time is desirably not more than 3 hours.

The cooling rate after the isothermal holding is preferably higher in order to obtain a uniform structure and needs to be set at not less than 20° C./second, preferably, not less than 50° C./second. Specifically, oil cooling or water cooling is preferable. On the other hand, if the cooling rate is less than 20° C./second, the structure tends to differ between the surface of the steel material and the inside, whereby the structure that is described in the present invention may not be obtained.

Shot Peening Step

Shot peening is a method of providing compressive residual stress on a surface of the coiled steel material by colliding a shot of metal or sand on the coiled steel material, whereby the sag resistance and the fatigue resistance of the spring are improved. In the present invention, in addition to the compressive residual stress that is obtained by ordinary shot peening, higher compressive residual stress is provided to deep inside by the deformation-induced martensitic transformation of the residual austenite. The shot peening may be performed by using a shot of cut wires, steel balls, high hardness particles such as of the FeCrB type, or the like. The degree of the compressive residual stress can be adjusted by a sphere-equivalent diameter of the shot, shooting speed, shooting time, and a multistep shooting process.

In addition, by performing the shot peening, the residual austenite occurs deformation-induced transformation and is transformed into martensite with higher strength. As a result, the volume expansion occurs according to the transformation, whereby high compressive residual stress is provided, and the effect for pinning the dislocations is further increased. Accordingly, the sag resistance is further improved.

Setting Step

A setting step is optionally performed by providing plastic strain to the coiled steel material so as to improve the elastic limit and to decrease the amount of sag (amount of permanent set) while in use. By performing the setting (hot setting) at a temperature of 200 to 300° C., the sag resistance is further improved. By performing the setting, the residual austenite undergoes deformation-induced transformation and is transformed into martensite with higher strength. As a result, the volume expansion occurs according to the transformation, whereby high compressive residual stress is provided, and the effect for pinning the dislocations is more increased. Accordingly, the sag resistance is further improved.

2. Second Embodiment

A spring and a production method therefor in the Second Embodiment of the present invention will be described.

The chemical composition of a steel material and various characteristics in a cross section of a spring wire for the spring in the Second Embodiment of the present invention are the same as in the case of the First Embodiment. Moreover, the area ratios of the structures in a cross section are the same as in the case of the First Embodiment, except that an average circle-equivalent grain diameter of the residual austenite is limited. Therefore, only this difference will be described.

Average Circle-Equivalent Grain Diameter of Residual Austenite: Not More than 3 μm As described above, the residual austenite with high carbon concentration has high strength, and the effect for pinning the dislocations is obtained by dispersing fine residual austenite grains with high strength, whereby the sag resistance is improved. If an average circle-equivalent grain diameter of the residual austenite exceeds 3 μm, fine residual austenite is not sufficiently dispersed, whereby the effect for pinning the dislocations is not sufficiently obtained.

The production method for the spring in the Second Embodiment of the present invention is the same as that in the First Embodiment except that the isothermal holding is performed at a temperature of (Ms point−20° C.) to (Ms point+60° C.) in the heat treatment step. Therefore, only this difference is described as follows.

In the production method for the spring in the Second Embodiment of the present invention, the isothermal holding temperature needs to be set at a temperature of (Ms point−20° C.) to (Ms point+60° C.), which is a very important parameter to be controlled in the production method for obtaining the spring steel and the spring of the present invention. If the isothermal holding temperature is less than (Ms point−20° C.), martensite is excessively generated in an initial stage of the transformation and prevents improvement of the ductility, and bainite is not obtained at an area ratio of not less than 65%. On the other hand, if the isothermal holding temperature exceeds (Ms point+60° C.), bainite is coarsened, whereby the tensile strength is decreased, and strength sufficient to withstand a load as a spring is not obtained. By isothermally holding at a temperature of around Ms point, fine bainite is precipitated. When fine bainite is precipitated, austenite remains in microscopic spaces and thereby becomes the residual austenite grains with the average circle-equivalent grain diameter of not more than 3 μm.

EXAMPLES

1. First Example

An austempered wire rod having a composition shown in Table 1 was prepared and was cold coiled into a predetermined shape by a coiling machine, whereby coiled wire rods are obtained. The coiled wire rods were subjected to a heat treatment at a condition shown in Table 3. In the heat treatment, the coiled wire rods were heated to a temperature of Ac3 point to (Ac3 point+250° C.) in a heating furnace and were austenitized. Then, the coiled wire rods were held in a salt bath, which was held at a temperature T (° C.), for a time t (seconds) and were cooled. The temperature T and the time t are shown in Table 3. Next, the coiled wire rods were subjected to shot peening. In the shot peening, round cut wires with a sphere-equivalent diameter of 0.8 mm were used in a first step. Then, round cut wires with a sphere-equivalent diameter of 0.45 mm, and particles of sand with a sphere-equivalent diameter of 0.1 mm, were used in a second step and a third step, respectively. Moreover, the coiled wire rods were heated to 230° C. and were subjected to setting corresponding to maximum shear stress τ=1473 MPa. Thus, springs were produced, and specifications of the springs are shown in Table 2. Various characteristics were investigated in the following manner with respect to the springs, and results thereof are shown in Table 3.

TABLE 1

| Steel type | Chemical composition (mass %) Balance is iron and inevitable impurities | | | | | | Ac3 (° C.) | Ms (° C.) |
| --- | --- | --- | --- | --- | --- | --- | --- | --- |
| | C | Si | Mn | Cr | P | S | | |
| SWOSC-V | 0.57 | 1.42 | 0.66 | 0.67 | 0.010 | 0.008 | 806 | 284 |

TABLE 2

| Steel type | SWOSC-V |
| --- | --- |
| Wire diameter | 4.1 mm |
| Average coil diameter | 24.6 mm |
| Total coils | 5.75 |
| Active coils | 3.25 |
| Coiling direction | Right-handed coiling |
| Free height | 56.5 mm |
| Spring constant | 57.3 N/mm |

TABLE 3

| No. | T (° C.) | t (s) | Area ratio of bainite (B) (%) | Area ratio of residual austenite ($\gamma_R$) (%) | Area ratio of martensite (%) | Carbon concentration in residual asutenite (mass %) | Hardness at center portion (HV) | Thickness of surface layer having greater hardness than the center portion by 50 to 500 HV (mm) | Maximum compressive residual stress (MPa) | Thickness of compressive residual stress layer (mm) | Fatigue resistance | |
| --- | --- | --- | --- | --- | --- | --- | --- | --- | --- | --- | --- | --- |
| 1 | 250 | 1200 | 72.2 | 11.7 | 16.1 | 0.58 | 678 | 0.07 | 874 | 0.36 | Bad | Comparative example |
| 2 | 300 | 300 | 6.2 | 7.8 | 86.0 | 0.59 | 704 | 0.06 | 788 | 0.32 | Bad | Comparative example |
| 3 | 300 | 1200 | 81.2 | 8.6 | 10.2 | 1.22 | 614 | 0.09 | 972 | 0.46 | Good | Practical example |
| 4 | 300 | 2400 | 83.5 | 7.3 | 9.2 | 1.37 | 598 | 0.12 | 1017 | 0.50 | Good | Practical example |
| 5 | 350 | 1200 | 73.6 | 16.5 | 9.9 | 1.52 | 515 | 0.04 | 561 | 0.28 | Bad | Comparative example |

Identification of Phases in Structure and Carbon Concentration in Residual Austenite Phases in the structure were identified as follows. A cross section of a sample was polished, and the sample was immersed in a nital (a solution of 3% nitric acid and alcohol) for a few seconds. In the structure of the cross section, bainite is easily corroded by the nital and thereby appears black or gray in an optical micrograph. On the other hand, martensite and residual austenite have high corrosion resistance to the nital and thereby appears white in an optical micrograph. By using these functions, an image of an optical micrograph is processed, whereby the ratio of bainite (black portions and gray portions) and the total ratio of martensite and residual austenite (white portion) were measured. The ratio of residual austenite was measured by using an X-ray diffraction method with respect to a buff finished sample. The ratio of martensite is calculated by subtracting the ratio of residual austenite, which was obtained by the X-ray diffraction method, from the total ratio of martensite and residual austenite, which was obtained by using the optical micrograph. The average carbon concentration in the residual austenite was calculated from the following relational expression by using lattice constant a (nm). The lattice constant was measured from each of diffraction peak angles of (111), (200), (220), and (311) by X-ray diffraction. These results are also shown in Table 3.

First Formula $$a(\text{nm}) = 0.3573 + 0.0033 \times (\text{mass \%}C)$$

Figure 1A:
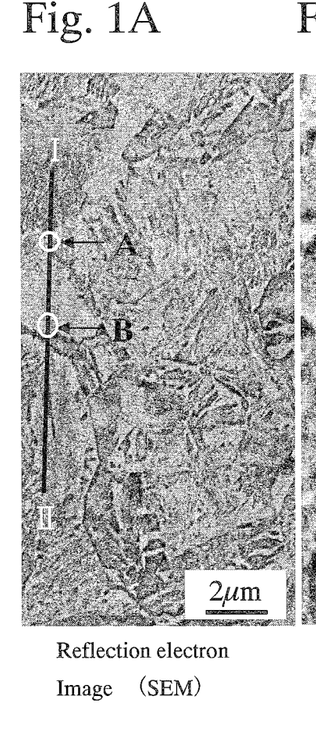
FIG. 1A shows a result of observation of a reflection electron image (SEM (Scanning Electron Microscopy)) of a structure of a practical example of the present invention.
Figure 1B:
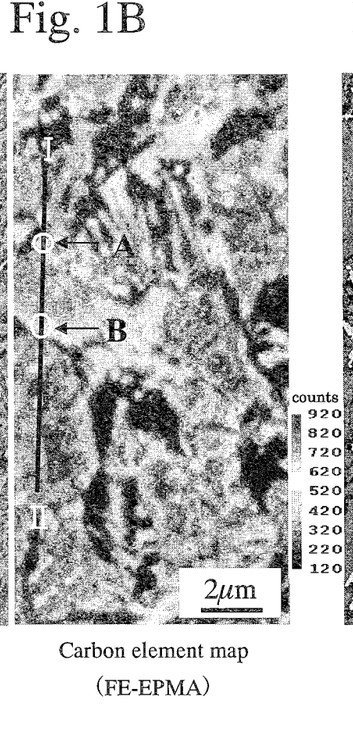
FIG. 1B shows a result of measurement of carbon element map (FE-EPMA (Field Emission Electron Probe Micro Analyzer)).
Figure 1C:
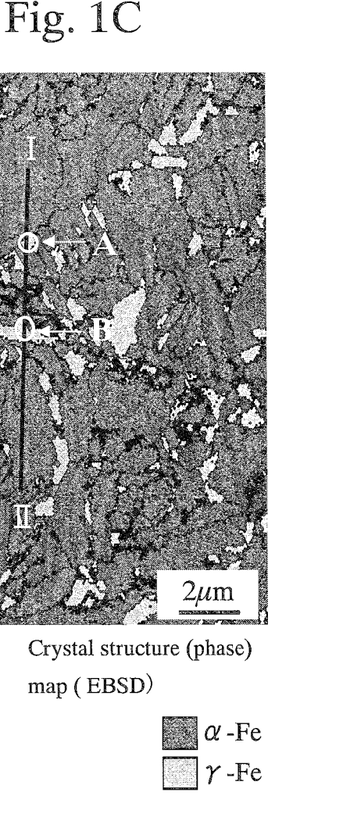
FIG. 1C shows a result of measurement of a crystal structure (phase) map (EBSD (Electron Backscatter Diffraction)).
Figure 1D:
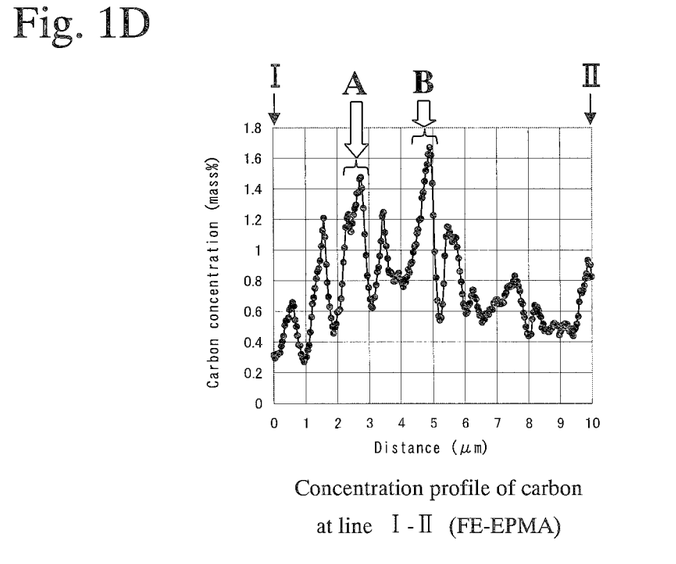
FIG. 1D is a graph showing a result of analysis of carbon concentration at line I-II in FIG. 1B.

Moreover, the validity of this method was evaluated by another means. FIG. 1A to 1D show results of evaluating an area that existed at a depth of 1.025 mm from the outer circumferential surface toward the center of a cross section of the wire spring of a sample No. 3 of a practical example of the present invention. FIG. 1A shows a result of observation of a reflection electron image (SEM (Scanning Electron Microscopy)). FIG. 1B shows a result of measurement of carbon element map (FE-EPMA (Field Emission Electron Probe Micro Analyzer)). FIG. 1C shows a result of measurement of crystal structure (phase) map (EBSD (Electron Backscatter Diffraction)). FIG. 1D shows a result of analysis of carbon concentration at line I-II in FIG. 1B. The carbon concentration differed in each of the residual austenite, and it was approximately 1.2 to 1.5% in the area A in FIG. 1B and was approximately 1.3 to 1.7% in the area B in FIG. 1B. These carbon concentrations are approximately equal to the average carbon concentration of 1.22% that was measured by X-ray diffraction. Accordingly, the method of measuring the carbon concentration in the residual austenite by X-ray diffraction is reasonable.

Vickers Hardness at Center Portion

Vickers hardness was measured at five points around the center portion of a cross section of the spring, and an average thereof was calculated as Vickers hardness at the center portion.

Thickness of High Hardness Layer

Vickers hardness was measured from the outer circumferential surface toward the center of a cross section of the steel material, and a thickness of a high hardness layer, which had greater Vickers hardness than the center by 50 to 500 HV, from the surface was measured.

Residual Stress Distribution

Residual stress was measured with respect to the outer circumferential surface of the steel material by using the X-ray diffraction method. Then, the entire surface of the steel material was chemically polished, and the above measurement was performed again. By repeating these steps, a residual stress distribution in a depth direction was obtained.

Fatigue Resistance

A fatigue test was performed at average stress τ m of 735 MPa and stress amplitude T a of 637 MPa. The sample that resisted more than $1 \times 10^7$ times was determined to have superior fatigue resistance and is represented by "Good" in Table 3. The sample that broke before 1×10⁷ times was performed was determined to have inferior fatigue resistance and is represented by "Bad" in Table 3. The results of investigating various characteristics are shown in Table 3.

The samples Nos. 3 and 4, which satisfied the conditions that are described in the present invention, exhibited superior fatigue resistance. In contrast, the samples Nos. 1, 2, and 5, which did not satisfy the conditions that are described in the present invention, had insufficient fatigue resistance because each of the samples did not satisfy the following conditions. That is, in the sample No. 1, the isothermal holding temperature was lower than Ms point in the heat treatment step, whereby martensite, which was generated in an initial stage of the transformation, excessively increased the hardness at the center potion and prevented improvement of the ductility.

In the sample No. 2, the isothermal holding time was short in the heat treatment step, whereby the ratio of martensite was high. As a result, the ratio of bainite was small, whereby the hardness at the center portion was excessively increased. In the sample No. 5, the isothermal holding temperature was too high in the heat treatment step, whereby the ratio of residual austenite was excessively increased, and the hardness at the center portion was too low. Moreover, although the residual austenite was transformed into deformation-induced martensite, binding force of surroundings thereof was low because the hardness was low, whereby the compressive residual stress was low, and the compressive residual stress layer was thin.

2. Second Example

Spring of samples Nos. 6 to 11 were produced as in the same manner as in the First Example except that the heat treatment was performed as follows. The coiled wire rods were heated to 850° C. in a heating furnace and were austenitized, and then they were held in a salt bath, which was held at a temperature T (° C.), for a time t (seconds) and were cooled. The temperature T and the time t are shown in Table 4.

Various characteristics were investigated in the following manner with respect to the springs, and the results thereof are shown in Table 4. The identification of phases in structure, the average carbon concentration in residual austenite, Vickers hardness at center portion, a thickness of high hardness area, and a residual stress distribution, were evaluated by the same manner as in the First Example, and therefore, descriptions thereof are omitted.

TABLE 4

| No. | T (° C.) | t (s) | Area ratio of bainite (B) (%) | Area ratio of residual austenite ($\gamma_R$) (%) | Area ratio of martensite (%) | Carbon concentration in residual asutenite (mass %) | Average of residual austenite grains (μm) | Hardness at center portion (HV) | Thickness of surface layer having greater hardness than the center portion by 50 to 500 HV (mm) | Maximum compressive residual stress (MPa) | Thickness of compressive residual stress layer (mm) | Sag resistance | |
|---|---|---|---|---|---|---|---|---|---|---|---|---|---|
| 6 | <u>250</u> | 1200 | 72.2 | 11.7 | 16.1 | <u>0.58</u> | <u>1.7</u> | 678 | 0.07 | 874 | 0.36 | Bad | Comparative example |
| 7 | 280 | 3600 | 86.7 | 7.4 | 5.9 | 1.38 | 1.0 | 626 | 0.10 | 1113 | 0.38 | Very good | Practical example |
| 8 | 300 | <u>300</u> | <u>6.2</u> | 7.8 | 86.0 | <u>0.59</u> | <u>1.3</u> | 704 | 0.06 | <u>788</u> | <u>0.32</u> | Bad | Comparative example |
| 9 | 300 | 1200 | 81.2 | 8.6 | 10.2 | 1.22 | 1.2 | 614 | 0.09 | 972 | 0.46 | Good | Practical example |
| 10 | 300 | 2400 | 83.5 | 7.3 | 9.2 | 1.37 | 1.0 | 598 | 0.12 | 1017 | 0.50 | Very good | Practical example |
| 11 | <u>350</u> | 1200 | 73.6 | <u>16.5</u> | 9.9 | 1.52 | <u>3.7</u> | 515 | <u>0.04</u> | <u>561</u> | <u>0.28</u> | Bad | Comparative example |

Note:
The underline indicates that the value does not satisfy the condition described in the present invention.

Circle-Equivalent Diameter of Residual Austenite Grains

First, γ-Fe phase was identified in a crystal structure map that was obtained by the EBSD method. Then, circle-equivalent diameters of residual austenite grains were measured by using an image processing software.

Sag Resistance

Sag test was performed as follows. The sample was fixed while it was compressed by applying a load so that maximum shear stress was 1372 MPa, and it was immersed in silicone oil at 120° C. Then, 48 hours after the sample was immersed, the sample was taken out from the silicone oil, and the load was removed when the sample was cooled down to room temperature. A load, which was applied so that the spring was compressed to a predetermined height, was measured before and after the sag test, and a decreased amount ΔP of the load was obtained. The decreased amount ΔP was substituted into the following formula, and residual shear strain (γ) was calculated as the amount of sag.

Second Formula $$\gamma = \{8D/(\pi d^3 d^3 G)\} \times \Delta P$$

In the second formula, D represents an average coil diameter, d represents a wire diameter, and G represents a module of transverse elasticity (=78,500 MPa). The sample having the residual shear strain of not more than 10×10⁻⁴ was determined to have excellent sag resistance and is represented by "Very good" in Table 4. The sample having the residual shear strain of greater than 10×10⁻⁴ and not more than 15×10⁻⁴ was determined to have superior sag resistance and is represented by "Good" in Table 4. The sample having the residual shear strain of greater than 15×10$^{-4}$ was determined to have inferior sag resistance and is represented by "Bad" in Table 4. The results of investigating various characteristics are shown in Table 4.

The samples Nos. 7, 9, and 10, which satisfied the conditions that are described in the present invention, exhibited superior sag resistance. In contrast, the samples Nos. 6, 8, and 11, which did not satisfy the conditions of the present invention, had the following defects. That is, in the sample No. 6, the isothermal holding temperature was lower than (Ms point−20° C.) in the heat treatment step, whereby martensite, which was generated in an initial stage of the transformation, excessively increased the hardness at the center potion, and the ductility was decreased. In addition, the carbon concentration in the residual austenite was low, whereby the strength of the residual austenite was low. As a result, the sag resistance was inferior.

In the sample No. 8, the isothermal holding time was short in the heat treatment step, whereby the ratio of bainite was low. As a result, the ratio of martensite was high, whereby the hardness at the center portion was excessively increased. In addition, the carbon concentration in the residual austenite was low. Accordingly, the sag resistance was inferior. Moreover, the volume expansion according to the deformation-induced martensitic transformation was relatively small, whereby the compressive residual stress was low, and the compressive residual stress layer was thin.

In the sample No. 11, the isothermal holding temperature was too high in the heat treatment step, whereby precipitation of carbides was decreased, and the carbon concentration in the austenite was excessively increased. As a result, the Ms point was greatly decreased, and austenite was stabilized, whereby the ratio of residual austenite was excessively increased, and the hardness at the center portion was too low. In addition, since the isothermal holding temperature was too high, coarse bainite was precipitated, whereby the average diameter of residual austenite grains exceeded 3 μm. As a result, the sag resistance was inferior. Moreover, although the residual austenite underwent volume expansion due to deformation-induced martensitic transformation, binding force of surroundings thereof was low because the hardness was low, whereby the compressive residual stress was low, and the compressive residual stress layer was thin.

INDUSTRIAL APPLICABILITY

The present invention can be applied to springs that are required to have high fatigue resistance, such as valve springs for automobile engines, or the like. Moreover, the present invention can be applied to any springs such as coils, plate springs, torsion bars, stabilizers, or the like.

The invention claimed is:

1. A production method for a coil spring comprising:
a step of preparing a wire rod consisting of, by mass %, 0.5 to 0.7% of C, 1.0 to 2.0% of Si, 0.1 to 1.0% of Mn, 0.1 to 1.0% of Cr, not more than 0.035% of P, not more than 0.035% of S, and the balance of Fe and inevitable impurities;
a step of cold forming the wire rod into a coil spring;
a heat treatment step after the cold forming; and
a shot peening step of shooting shot at the coil spring after the heat treatment step,
wherein in the heat treatment step, the coil spring is austenitized at a temperature of Ac3 point to (Ac3 point+250° C.) and is cooled at a cooling rate of not less than 20° C./second, and then the coil spring is held at a temperature of Ms point to (Ms point+60° C.) for not less than 400 seconds and is cooled to room temperature at a cooling rate of not less than 20° C./second, thereby obtaining a coil spring having a structure including not less than 65% of bainite and 4 to 13% of residual austenite by area ratio in a cross section, the residual austenite containing carbon at an average concentration of 0.65 to 1.7%,
the coil spring having a compressive residual stress layer in a cross section from a surface to a depth of 0.35 mm to D/4, in which D (mm) is a circle-equivalent diameter of the cross section, the compressive residual stress layer having maximum compressive residual stress of 800 to 2000 MPa, and
the coil spring having a center portion with Vickers hardness of 550 to 650 HV in a cross section and having a high hardness layer with greater hardness than the center portion by 50 to 500 HV from a surface to a depth of 0.05 to 0.3 mm.

2. The production method for the spring according to claim 1, wherein the coil spring is cooled to room temperature at a cooling rate of not less than 50° C./second.

3. The production method for a spring according to claim 1, further comprising a setting step of providing permanent strain to the coil spring after the shot peening step.

4. The production method for a spring according to claim 1, wherein the structure includes martensite at 5 to 30% by area ratio in a cross section.

5. The production method for a spring according to claim 4, wherein the area ratio of the martensite is 5.9 to 30%.

6. The production method for a spring according to claim 4, wherein the area ratio of the martensite is 9.2 to 30%.

7. The production method for a spring according to claim 1, wherein the coil spring is formed of a wire rod with a diameter of 1.5 to 15 mm.

8. A production method for a spring, comprising:
a step of preparing a wire rod consisting of, by mass %, 0.5 to 0.7% of C, 1.0 to 2.0% of Si, 0.1 to 1.0% of Mn, 0.1 to 1.0% of Cr, not more than 0.035% of P, not more than 0.035% of S, and the balance of Fe and inevitable impurities;
a step of cold forming the wire rod into a coil spring;
a heat treatment step after the cold forming; and
a shot peening step of shooting shot at the coil spring after the heat treatment step,
wherein in the heat treatment step, the coil spring is austenitized at a temperature of Ac3 point to (Ac3 point+250° C.) and is cooled at a cooling rate of not less than 20° C./second, and then the coil spring is held at a temperature of (Ms point−20° C.) to (Ms point+60° C.) for not less than 400 seconds and is cooled to room temperature, thereby obtaining a coil spring having a structure including not less than 65% of bainite and 4 to 13% of residual austenite by area ratio in a cross section, the residual austenite containing carbon at an average concentration of 0.65 to 1.7%,
the coil spring having a compressive residual stress layer in a cross section from a surface to a depth of 0.35 mm to D/4, in which D (mm) is a circle-equivalent diameter of the cross section, the compressive residual stress layer having maximum compressive residual stress of 800 to 2000 MPa, and
the coil spring having a center portion with Vickers hardness of 550 to 650 HV in a cross section and having a high hardness layer with greater hardness than the center portion by 50 to 500 HV from a surface to a depth of 0.05 to 0.3 mm, wherein the residual austenite has an average circle-equivalent grain diameter of not more than 3 μm.

9. The production method for the spring according to claim 8, wherein the coil spring is cooled to room temperature at a cooling rate of not less than 20° C./second.

10. The production method for the spring according to claim 8, further comprising a setting step of providing permanent strain to the coil spring after the shot peening step.

11. The production method for a spring according to claim 8, wherein the structure includes martensite at 5 to 30% by area ratio in a cross section.

12. The production method for a spring according to claim 8, wherein the coil spring is formed of a wire rod with a diameter of 1.5 to 15 mm.

13. The production method for a spring according to claim 1, wherein the compressive residual stress layer contains residual austenite at a lower ratio than that of the center portion but not less than 4%.

14. The production method for a spring according to claim 13, wherein said lower ratio is produced by transforming residual austenite into martensite by deformation-induced transformation by shot peening.

* * * * *